Feb. 20, 1973    W. H. DEANE ET AL    3,717,398
HOSPITAL LOCKERS

Filed June 8, 1971    3 Sheets-Sheet 2

INVENTORS
WILLIAM HARRY DEANE
GEOFFREY CROMPTON
BY
William R. Lieberman
ATTORNEY United States Patent Office
3,717,398
Patented Feb. 20, 1973

3,717,398
HOSPITAL LOCKERS
William Harry Deane, London, and Geoffrey Crompton, Willington, England, assignors to Matburn (Holdings) Limited, London, England
Filed June 8, 1971, Ser. No. 151,110
Int. Cl. A47b 81/00
U.S. Cl. 312—283    6 Claims

ABSTRACT OF THE DISCLOSURE

An article of furniture such as a cupboard, chest or hospital bedside cabinet, is formed in two separate parts of moulded foamed synthetic plastics material. These two parts are joined together after moulding. The upper part is open on its under side. The lower part closes the under side of the upper part when the article of furniture is assembled.

BRIEF SUMMARY OF THE INVENTION

An object of the invention is to provide an improved method of constructing an article of furniture such as a cabinet which will provide an attractive clean appearance and will reduce the number of manufacturing processes and stages as compared with conventional methods of manufacturing such a cabinet.

Broadly the invention consists in a cabinet formed in two separate parts, each of a moulded foamed synthetic plastics material, which are subsequently joined together, the upper part being open on its underside, and the lower part being arranged to close the under side of the upper part when the cabinet is assembled.

The moulded parts preferably comprise a lightweight rigid foam material such as high density polyurethane. This foam material may form the whole basic structure of the unit, or if preferred filling materials or inserts may be embedded in the foam material during manufacture. The foam material is preferably chosen to have "self-skinning" properties, i.e. it forms its own hard surface skin during the moulding process, or alternatively other films or sheets of suitable surfacing materials, such as melamine resins or acrylonitrite butadiene styrene (ABS) material may be incorporated in the surface of the moulding during manufacture.

The upper part of the cabinet is preferably formed to provide a passage for a drawer, and the drawer is conveniently mounted to slide on a pair of rails formed integral with the lower part. The upper part may also have a second opening extending perpendicularly to the said passage.

BRIEF DESCRIPTION OF THE ACCOMPANYING DRAWINGS

Figure 1:
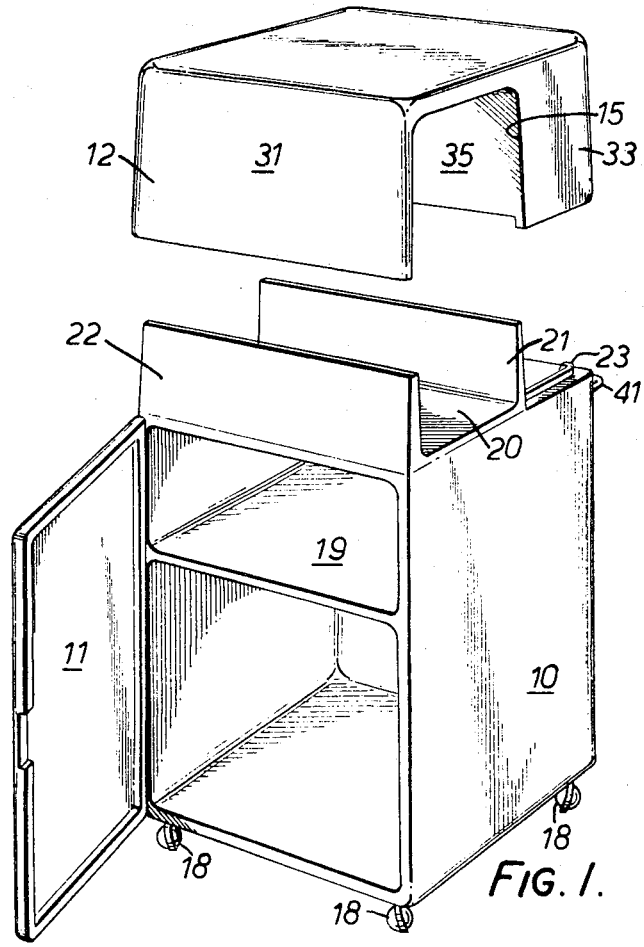
Figure 2:
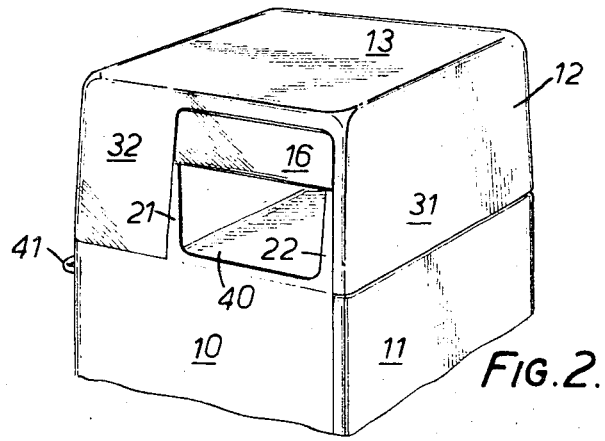
Figure 3:
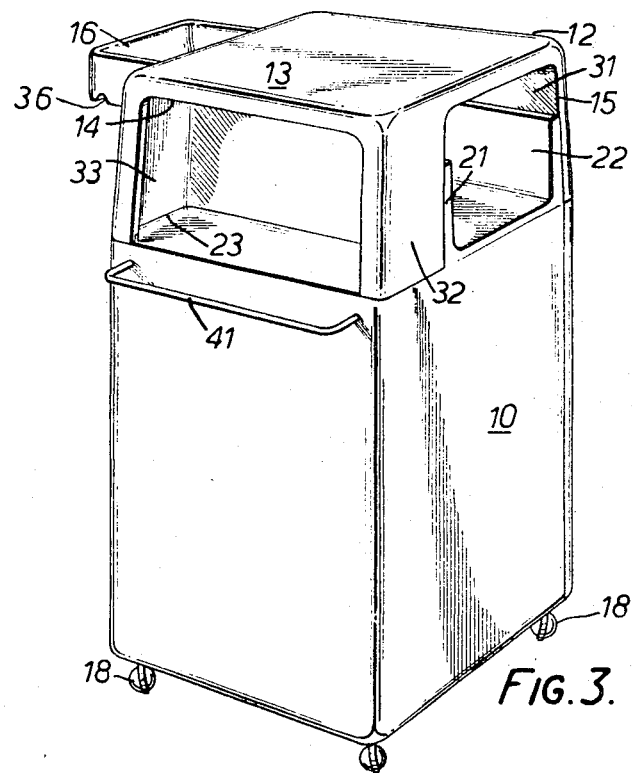
Figure 5:
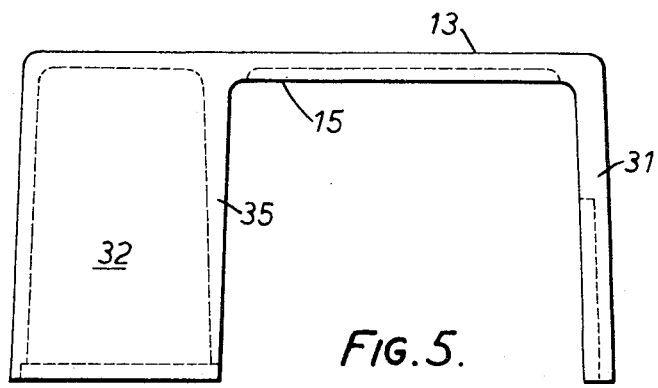
Figure 6:
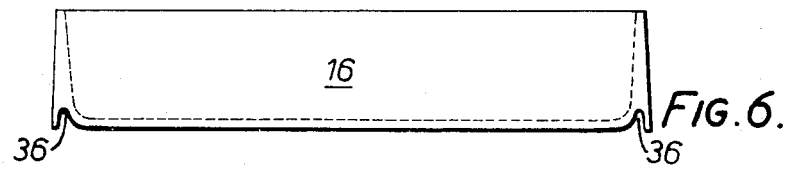
Figure 4:
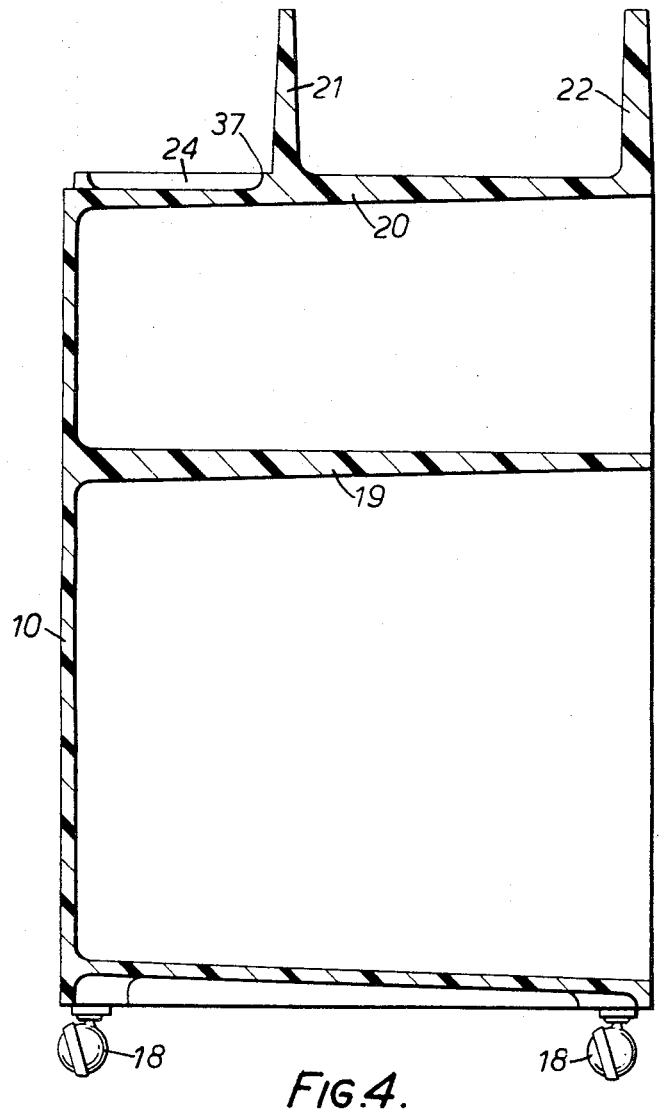

FIG. 1 is a general perspective view of a hospital bedside cabinet according to the invention, shown with the two main components "exploded" apart, FIG. 2 is another perspective view of the same cabinet from another side, with the two main components in their assembled positions, FIG. 3 is another perspective view partly from the rear showing the assembled cabinet with a drawer in position, FIG. 4 is a vertical section through the lower chest of the cabinet, FIG. 5 is a side elevation of the upper component, and FIG. 6 is a side elevation of the drawer.

DESCRIPTION OF THE PREFERRED EMBODIMENTS

A hospital bedside cabinet, has a main lower chest or cupboard indicated at 10, with a hinged door 11, and an upper section 12 including a flat table top 13, and having a rear opening 14 to a small open space, and another transverse opening 15 to accommodate a drawer 16. If manufactured by conventional methods such a cabinet can be expensive and laborious to produce.

In this example of the invention a cabinet having all these facilities is produced in two main components plus a drawer and door, each of which may be formed by a moulding operation so that a minimum of manual joinery or cabinet making procedure is needed.

The bottom unit 10 of the cabinet is a generally rectangular box-like structure, open on one side where the hinged door 11 is mounted and supported on four casters 18 at the lower corners. A horizontal shelf 19 is provided at an intermediate height. This lower unit is conveniently formed as a one-piece moulding in a rigid high density polyurethane foam material, and may include inserts or fillers to increase the strength and reduce the cost. The foam material is selected for its "self-skinning" properties, i.e. it forms a hard surface skin during the moulding operation. The upper end of this lower unit is closed by a top wall 20 and is provided with two vertical spaced parallel flanges or rails 21, 22 extending from front to rear, the rail 22 lying close adjacent to one side. The height of these flanges is approximately 5 inches and the flanges are spaced apart at an interval of approximately 12 inches. Their upper edges act as runners for the drawer 16 as will be described and they also serve to position and locate the top unit 12 on the bottom unit 10. In addition the moulding includes a pair of low spaced parallel ribs 23, 24 extending rearwardly towards the back of the cabinet, to provide further location for the top unit.

The upper unit 12 of the cabinet is also formed as a single unitary moulding in high density polyurethane foam and comprises a top horizontal panel providing the table surface 13, with three downward projecting side walls 31, 32, 33 from three of its sides. One of these side walls 31 is designed to fit outside the outer one 22 of the two parallel vertical flanges 21, 22 on the bottom unit. The other two side walls 32, 33 are positioned on opposite sides adjacent the back of the cabinet and are designed to fit outside the two ribs 23, 24. Each wall 32, 33 extends only part way along the respective side and terminates at the entrances to the transverse opening 15, which extends through the unit from side to side. The two walls 32, 33 provide an open recess at the rear of the cabinet, to receive small toilet articles for example, and the unit also includes a vertical wall 35 separating this recess from the opening 15. This wall 35 lies flush against the second 21 of the two vertical flanges on the bottom unit when the top and bottom units are finally assembled.

The drawer 16 is also a moulded one-piece unit formed of the same polyurethane foam material, with inserts if required, and is dimensioned to fit within the upper part of the transverse passageway 15 and to slide on the upper edges of the two vertical flanges 21, 22. The drawer has finger grooves 36 at both ends and is capable of being opened from either direction, and the lower part of the passage below the drawer (indicated at 40 in FIG. 2) is also open at both ends. This lower passageway 14 may be fitted with internal shelves, drawers or the like and a hinged door or sliding drawer may be fitted at each end if required.

In addition a towel rail 41 is provided. In this illustrated example the towel rail is a separate unit secured by bolts to the rear wall of the bottom unit, but alternatively the rail may be moulded as an integral part of the top unit with an internal reinforcing metal insert which also extends into the adjacent main wall section of the lower unit.

The top panel 13 may be formed with a shallow depression or tray and all the external and internal corners are preferably radiussed or curved to facilitate cleaning, and are tapered in cross section to facilitate withdrawal from the moulds used in manufacture. The moulded units may be provided with surface layers or coatings of suitable hard smooth washable properties, with or without colouring agents. The top and bottom units are assembled simply by locating one on the other with an intervening layer of adhesive capable of making a strong bond with the polyurethane foam material.

It will be noted that this illustrated design of a cabinet, constructed primarily from two main moulded parts, provides many advantages in manufacture, and in the assembled article. By designing the upper part so that it is entirely open on its under side it can be moulded as one unit, and withdrawn in this vertical direction from its mould, even though the unit has one pair of aligned horizontal openings in opposite sides for the through passage 15, and another opening between the walls 32, 33, facing in a perpendicular direction. Also by forming the runner flanges 21, 22 integral with the lower part of the cabinet, and extending in the same direction as the main opening for the door 11, the lower part can also be moulded without difficulty as one unit, and withdrawn from its mould in this horizontal direction. The design of the lower part also allows the shelf 19 to be moulded as an integral component.

What is claimed is:

1. A two-part cabinet of a moulded rigid foamed synthetic plastics material permanently secured together, an upper part being open on its under side and having communicating openings through opposite sides thereof, and an opening into the upper part through another side, a lower part closing the under side of the upper part when the cabinet is assembled and having a pair of upstanding flanges extending into the through communicating openings.

2. A cabinet as in claim 1 in which the lower part is hollow to provide storage space therewithin and is open to the atmosphere on a side adjacent to one of the flanges.

3. A cabinet as in claim 2 and a closure for the opening, of the same moulded foamed synthetic plastic material as the upper and lower parts thereof.

4. A cabinet according to claim 2, in which the foamed polyurethane material forms an integral smooth surface skin on all surfaces thereof.

5. A cabinet according to claim 1, in which the lower part is formed with a pair of spaced upstanding parallel flanges, extending into the through opening of the upper part, and a shallow tray riding atop the flanges within said opening.

6. A cabinet according to claim 1, in which all corners, re-entrants, and edges of the upper and lower parts are rounded.

References Cited

UNITED STATES PATENTS

| | | | |
|---|---|---|---|
| 2,139,995 | 4/1938 | Salvage | 312—250 |
| 2,716,046 | 8/1955 | Minturn | 312—286 |
| 2,971,807 | 2/1961 | La Vigne | 312—287 |
| 3,241,898 | 3/1966 | Propst | 312—107 |

JAMES C. MITCHELL, Primary Examiner

U.S. Cl. X.R.

312—285